(12) United States Patent
Koepf et al.

(10) Patent No.: US 11,328,889 B2
(45) Date of Patent: *May 10, 2022

(54) CIRCUIT BREAKER

(71) Applicant: ELLENBERGER & POENSGEN GMBH, Altdorf (DE)

(72) Inventors: Hendrik-Christian Koepf, Nuremberg (DE); Ernst-Dieter Wilkening, Braunschweig (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 53 days.

This patent is subject to a terminal disclaimer.

(21) Appl. No.: 16/937,149

(22) Filed: Jul. 23, 2020

(65) Prior Publication Data
US 2020/0357592 A1    Nov. 12, 2020

Related U.S. Application Data

(60) Division of application No. 15/888,375, filed on Feb. 5, 2018, now Pat. No. 10,790,107, which is a
(Continued)

(30) Foreign Application Priority Data

Aug. 5, 2015    (DE) .................... 10 2015 214 966.8

(51) Int. Cl.
*H01H 71/24* (2006.01)
*H02H 3/087* (2006.01)
(Continued)

(52) U.S. Cl.
CPC ...... *H01H 71/2445* (2013.01); *H01H 33/596* (2013.01); *H01H 50/021* (2013.01); *H01H 71/28* (2013.01); *H02H 3/087* (2013.01)

(58) Field of Classification Search
None
See application file for complete search history.

(56) References Cited

U.S. PATENT DOCUMENTS 2,834,925 A * 5/1958 Brinkruff ............... H01H 50/30
335/229
3,294,987 A   12/1966 Skrbina
(Continued)

FOREIGN PATENT DOCUMENTS

AU        714838 B2    12/1997
CN      101315836 A    12/2008
(Continued)

OTHER PUBLICATIONS

Korean Office Action dated May 17, 2019 in corresponding application 10-2018-7006383.
(Continued)

*Primary Examiner* — Jared Fureman
*Assistant Examiner* — Joel Barnett
(74) *Attorney, Agent, or Firm* — Muncy, Geissler, Olds & Lowe, P.C.

(57) ABSTRACT

A circuit breaker for interrupting a direct current, in particular in a power supply system in a vehicle having a main current path that includes a switch, and having a reed relay for detecting an electric current flow across the main current path. The switch is coupled to the reed relay. Also, a use of a circuit breaker is provided.

5 Claims, 6 Drawing Sheets

Related U.S. Application Data continuation of application No. PCT/EP2016/061299, filed on May 19, 2016.

(51) Int. Cl.
  *H01H 71/28* (2006.01)
  *H01H 33/59* (2006.01)
  *H01H 50/02* (2006.01)

(56) References Cited

U.S. PATENT DOCUMENTS

| | | | |
|---|---|---|---|
| 3,456,119 A | | 7/1969 | Schneider |
| 3,720,894 A | * | 3/1973 | Greenwood ....... H01H 71/2445 335/204 |
| 4,228,412 A | | 10/1980 | Dalley et al. |
| 6,600,640 B1 | * | 7/2003 | Buscher ............. H01H 71/2445 361/93.1 |
| 2003/0231090 A1 | * | 12/2003 | Copper ................ H01H 50/305 335/128 |
| 2009/0059458 A1 | | 3/2009 | Xu |

FOREIGN PATENT DOCUMENTS

| | | |
|---|---|---|
| CN | 102262982 A | 11/2011 |
| DE | 197 53 852 A1 | 6/1999 |
| EP | 0 813 218 A2 | 12/1997 |
| EP | 2 779 191 A1 | 9/2014 |
| GB | 1324880 | 7/1973 |
| KR | 2001-0032739 A | 4/2001 |
| WO | WO 2014/102446 A1 | 7/2014 |

OTHER PUBLICATIONS

International Preliminary Report for International Application No. PCT/EP2016/061299 with a filing date of May 19, 2016 (Englsih Language).

* cited by examiner

CIRCUIT BREAKER

This nonprovisional application is a divisional of U.S. application Ser. No. 15/888,375 which was filed on Feb. 5, 2018, which is a continuation of International Application No. PCT/EP2016/061299, which was filed on May 19, 2016, and which claims priority to German Patent Application No. 10 2015 214 966.8, which was filed in Germany on Aug. 5, 2015, and which are all herein incorporated by reference.

BACKGROUND OF THE INVENTION

Field of the Invention

The present invention relates to a circuit breaker for interrupting a direct current, comprising a main current path that includes a switch. The circuit breaker can be a component of an on-board electrical system of a vehicle, such as a motor vehicle or an aircraft. The invention further relates to the use of a circuit breaker for protecting an on-board electrical system of a vehicle.

Description of the Background Art

Photovoltaic systems usually have a number of photovoltaic modules, which are electrically connected in series or in parallel to each other. The combination of the photovoltaic modules themselves is contacted by means of a power line to an inverter, by means of which the electrical energy provided by the photovoltaic modules is fed into a supply network, which typically has an alternating current. In contrast, a direct current is conducted in the power line as a matter of principle. In order to disconnect the photovoltaic modules from the inverter in the event of a fault, circuit breakers are normally used by means of which damage to the inverter or burn-up of the photovoltaic modules due to an existing electric current flow is prevented. In this case, electric currents with a current strength of several 10 amperes are usually switched, wherein an electrical voltage of several 100 volts is present at the contacts between the individual electrical poles due to a suitable interconnection within the photovoltaic module.

A further application for circuit breakers for interrupting a direct current are vehicles, such as aircraft or motor vehicles. In this case, motor vehicles which are driven by an electric motor usually have a high-voltage on-board electrical system which comprises a high-voltage battery. An electrical voltage between 400 and 500 volts and a current strength of up to several 100 amperes is provided by the high-voltage battery. In the event of a malfunction of the high-voltage battery or a short circuit within the inverter or electric motor connected thereto, the quickest possible disconnection of the high-voltage on-board electrical system is required for safety reasons. To avoid burn-up of the high-voltage battery, the shortest possible switching time is required. This is also to be ensured in the case of a motor vehicle accident and a short circuit caused thereby within the electric motor or inverter, wherein, depending on the type of accident, failure of a power supply of the circuit breaker cannot be excluded.

A further challenge is the detection of the overcurrent itself, because due to the direct current a transformer coupling by means of coils cannot be used for detecting the current strength. Usually, therefore, bimetallic sensors or impact armature systems are used, which have an electric coil through which the electric current flows. In this case, however, losses arise within the electric coil, which, on the one hand, reduces the efficiency and, on the other, results in the heating of the circuit breaker, which must be adjusted to this heat input. The production costs are increased because of the cooling elements thus required. An alternative to this is the use of a shunt, in which the dropping electrical voltage across a certain line section whose electrical resistance is known is detected. The electric current flow is calculated on the basis of the detected electrical voltage. The disadvantage here is that the electrical resistance itself is temperature-dependent, which leads to a faulty value for the current strength. Alternatively, a material with a substantially temperature-independent electrical resistance is selected for the shunt, which increases the manufacturing costs, however.

In all circuit breakers, the sensors are always electrically contacted to the line, which leads to the electric current flow to be interrupted, so that the circuit breaker itself must be electrically isolated from other components. It is also necessary to take appropriate measures within the circuit breaker against an unintentional short circuit within the circuit breaker, which would otherwise lead to a continuation of the current flow and consequently to the functional loss of the circuit breaker.

SUMMARY OF THE INVENTION

It is therefore an object of the present invention to provide a particularly suitable circuit breaker for interrupting a direct current, wherein safety is increased in particular and manufacturing costs are preferably reduced. A further object of the invention is to provide for the use of a circuit breaker.

The circuit breaker is used for interrupting a direct current and is particularly suitable for interrupting a direct current. The circuit breaker is preferably provided and configured for interrupting a direct current. The circuit breaker is electrically contacted, for example, by means of a photovoltaic system or a photovoltaic module and, for example, a component of a photovoltaic system or a photovoltaic power plant. In an alternative to this, the circuit breaker is a component of an on-board electrical system of a vehicle, for example, a high-voltage on-board electrical system, which has an electrical voltage greater than 100 volts, 200 volts, 300 volts, or 400 volts and, for example, less than 1000 volts or 900 volts. The vehicle is, for example, an aircraft and the on-board electrical system serves, for example, to supply the actuators of the aircraft. In an alternative to this, the vehicle is a motor vehicle, in particular an electric or hybrid vehicle. In particular, in this case, the circuit breaker is a component of the on-board electrical system, which serves to supply current to a main drive of the motor vehicle.

The circuit breaker is provided in particular to switch electric currents greater than or equal to 10 amperes, 100 amperes, 200 amperes, 300 amperes, 500 amperes, or 600 amperes. Expediently, the maximum current strength switchable with the circuit breaker is 900 amperes, 1000 amperes, 1500 amperes, or 2000 amperes. For example, the electrical voltage switchable with the circuit breaker is greater than 10 volts, 50 volts, 100 volts, or 200 volts. In particular, the switchable electrical voltage is less than 500 volts, 600 volts, 700 volts, or 1000 volts.

The circuit breaker has a main current path, which conducts the direct current to be interrupted during operation. The main current path comprises a switch, by which when it is actuated the current flow is interrupted. For this purpose, the switch preferably comprises two contacts, which can be taken by means of suitable control of the switch from an electrically conductive to an electrically non-conductive state. In other words, the two contacts are electrically conductively connected to one another or electrically insulated from one another, wherein expediently the switching operations are reversible. The switch expediently has further components, which are not part of the main current path and by means of which an activation takes place, so that the current flow is influenced via the main current path. The switch is, for example, a semiconductor switch, in particular a power semiconductor switch, such as a GTO or a MOSFET. In an alternative, the switch is an electromechanical switch, such as a relay, or has a number of switching elements of this type, such as, for example, a semiconductor switch and an electromechanical switch, which are connected in parallel or in series to one another. For example, the switch comprises two series-connected electromechanical switches or a contactor in a double-break configuration.

The circuit breaker further comprises a reed relay for detecting the electric current flow conducted across the main current path. In other words, the reed relay is provided and configured to detect the electric current flow across the main current path. Relays of this kind are relatively inexpensive to produce, which is why the manufacturing cost of the circuit breaker is reduced. The reed relay, also referred to as a reed switch or reed contact, preferably has a glass tube with fused contact blades made of a ferromagnetic material. The contact blades are in particular made of an iron-nickel alloy and are provided and configured to move relative to one another as a function of an external magnetic field, wherein at a certain magnetic field strength, the two contacts are electrically contacted to one another. At a further predetermined magnetic field strength, the two contacts are electrically isolated from one another, expediently spaced apart from one another. In particular, the two contacts are disposed within a container, such as a tube, preferably a glass tube, which is expediently filled with a protective gas, for example nitrogen/hydrogen, or with an inert gas. Alternatively, the housing is evacuated.

The switch is coupled to the reed relay, for example, in terms of signaling or electrically. In particular, the reed relay is disposed such that the switching state of the switch is changed as a function of a signal detected by the reed relay. Expediently, the reed relay is disposed such that in the case of an overcurrent the main current path changes the switching state of the reed relay.

In this case, no direct electrical contact with the main current path is required for detecting the current flow, which is why the reed relay is preferably galvanically isolated from the main current path, so that a short circuit of the circuit breaker due to the reed relay can be substantially ruled out. In addition, no electric current is required for operating the reed relay, so that, on the one hand, it requires no electrical energy for operation. On the other hand, it is also not heated during operation, so that no relatively complex design measures for its cooling need to be taken. Further, detection of a change in the electric current flow takes place within a relatively short time, which is why the circuit breaker has a relatively short tripping characteristic, so that safety is increased.

The switch can have an electromechanical switch or is formed by it. Here, the switch contacts are moved by an electromagnetic coil, which is suitably connected to one of the switch contacts. The reed relay is preferably electrically contacted to the electric coil of the switch, for example, directly or by means of other electrical components. For example, the reed relay is connected in parallel to the electric coil. Particularly preferably, however, the reed relay is connected in series to the electric coil of the switch, so that the energization of the electric coil is changed upon a change in the switching state of the reed relay. For example, only one electric line or further electrical components are connected hereby between the reed relay and the electric coil. Due to the series connection, thus substantially immediately after a change in the electric current flow across the main current path and consequently switching of the reed relay, switching of the switch by its electric coil is enabled, which is why the switching time of the circuit breaker is shortened further and safety is increased.

For example, the reed relay can be designed in the manner of a single-pole switch, by means of which only an electric current flow is switched on or off. In this way, a relatively robust circuit breaker is provided whose manufacturing costs are relatively low. Consequently, upon actuation of the reed relay either the electric coil of the switch is energized or its energization is interrupted. Consequently, a switching operation is carried out by means of the switch, if a switching operation is performed by the reed relay. Particularly preferably, however, the reed relay has a changeover switch configuration which comprises a center terminal and a first and second terminal, wherein, depending on the switching state of the reed relay, the center terminal is electrically contacted either to the first terminal or to the second terminal. In this case, for example, the first terminal is normally electrically contacted to the center terminal, and the center terminal is electrically isolated from the second terminal. In other words, the first terminal is "normally closed" (NC) and the second terminal is "normally open" (NO). In particular, the reed relay is a monostable changeover contact or at least constructed in the manner of a monostable changeover contact. In an alternative, the reed relay is a bistable changeover contact or at least constructed in the manner of a bistable changeover contact.

The center terminal can be electrically contacted to the electric coil of the switch, so that, depending on the switching state, it is electrically contacted either to the first or second terminal. For example, the center terminal is contacted directly to the electric coil or further electrical components of the circuit breaker are located between them and these are thus connected in series to the center terminal and to the electric coil. At least, however, there are no further components of the reed relay between the center terminal and the electric coil. In particular, the switch is in the electrically conductive state only when the electric coil is energized, thus conducts current. Consequently, in a switching operation of the reed relay, the electrical energy stored in the coil is dissipated by a current flow to the second terminal, and therefore the switching time is further shortened.

Expediently, for this purpose, a first capacitor can be connected in parallel to the electric coil and the reed relay. In particular, the first capacitor is electrically contacted to the second terminal of the reed relay, which is electrically isolated from the center terminal in the normal state. Consequently, in the case of a reed relay switch, a resonant circuit is formed by means of the first capacitor and the electric coil of the switch, a circuit by means of which the electrical energy stored in the electric coil is dissipated. Expediently, the first capacitor is not charged when the circuit breaker is in the electrically conductive state (normal state), which is why, on the one hand, a possible operating time of the first capacitor is increased and, on the other, the possibility of an electrical short circuit is prevented.

A diode, for example two diodes, can be connected between the first capacitor and the electric coil. wherein one of the diodes, whose conducting direction is preferably directed in the same direction, is expediently arranged here between each electrode of the first capacitor and the electric coil. Consequently, in a switching operation of the reed relay, a single oscillation operation is carried out in which due to the inductance of the electric coil its stored electrical energy is substantially completely charged to the first capacitor. Discharging of the first capacitor is prevented due to the diode, which is why a renewed energization of the electric coil can be excluded, which would lead to unintentional reclosing of the switch.

The circuit breaker can comprise a drive coil, therefore, a further electric coil. The drive coil is coupled to the first capacitor. In particular, the drive coil is energized by the first capacitor. Preferably, a diode is connected in series to the drive coil, said diode by means of which dissipation of the electrical energy, transmitted to the drive coil, back to the first capacitor is prevented. Expediently, the drive coil is electrically contacted to a second capacitor. For example, the drive coil is connected in parallel to the second capacitor. Suitably, however, the second capacitor is connected in series to the drive coil, so that energization of the drive coil occurs or can at least occur by means of the second capacitor. For example, the second capacitor is electrically contacted to the first capacitor or connected thereto in terms of signaling. Expediently, the two capacitors are connected in such a way that when the charge state of the first capacitor changes, the drive coil is energized or at least an energization of the drive coil is changed. Consequently, in a switching operation of the reed relay, the energization of the drive coil is changed and/or in particular the state of charge of the second capacitor. Due to the drive coil, a discharge of the first capacitor is made possible, so that after the tripping of the circuit breaker, the electrical energy stored in the first capacitor is dissipated, which increases safety. In particular, a component is driven by means of the drive coil and thus the energy stored in the drive coil is dissipated.

Suitably, the drive coil can be electrically contacted to the second capacitor by means of a switching element. In other words, the switching element is located between the second capacitor and the drive coil. For example, the switching element is a semiconductor switch, in particular a thyristor. The gate of the semiconductor switch is preferably coupled to the first capacitor, for example, electrically or in terms of signaling, so that when the state of charge changes, the switching element switches, so that the drive coil is energized by the second capacitor. In other words, the drive coil is coupled to the first capacitor by the thyristor. Expediently, in the normal state, therefore, when the circuit breaker is in the electrically conductive state, the second capacitor is charged so that, when the state of charge of the first capacitor is exceeded above a threshold predetermined by the thyristor within a relatively short period of time, the drive coil is energized with a relatively large electric current flow.

In an embodiment of the invention, the drive coil is coupled to the first capacitor by means of a coupler. In particular, the coupler is a galvanically isolating coupler, so that the drive coil is galvanically isolated from the first capacitor and thus also from the reed relay. For example, during operation, a pulse transfer is made possible by means of the coupler despite galvanic isolation. Expediently, the coupler is a transformer or in particular an optocoupler, which has on the input side in particular a light-emitting diode (LED) and/or on the output side a photodiode, a phototransistor, and/or a DIAC.

Expediently, in this case, the second capacitor can be electrically contacted to the main current path. In particular, an electrode of the second capacitor is electrically contacted directly to the main current path, in particular to one of the terminals of the circuit breaker. Preferably, the second electrode of the second capacitor is electrically contacted to a further terminal of the circuit breaker, for example, directly or by means of further components. Expediently, during operation of the circuit breaker, the electrical voltage of the on-board electrical system is applied at the second capacitor, if the circuit breaker is a part of the on-board electrical system. The second capacitor in particular is suitably placed for this purpose. As a result, during operation a relatively large amount of electrical energy is stored by the second capacitor, so that when the reed relay is switched, not only the energy stored in the electric coil of the switch and transmitted by means of the first capacitor to the drive coil, but an amount of energy increased in contrast thereto is available for energizing the drive coil, which is why any component driven by the drive coil is accelerated relatively quickly. Due to the coupler, in this case, the second capacitor is galvanically isolated from the reed relay, which increases safety.

The coupler can be electrically contacted to the switching element, in particular to the gate of the semiconductor switch, in particular the thyristor, if these are present, so that the coupling between the drive coil and the coupler is created by means of the thyristor. Expediently, the coupler is connected in parallel to the first capacitor.

In particular, one electrode of the second capacitor is electrically contacted to the main current path by means of a third capacitor. In other words, the second and third capacitors are connected in series, wherein the third capacitor is placed between the second capacitor and the main current path. In this way, a galvanic isolation is realized between the second capacitor and the main current path, which further increases safety. In addition, not all of the electrical voltage applied to the main current path is applied to the second capacitor, which is why it can be made smaller, which reduces manufacturing costs. In an alternative to this, another galvanic decoupling between the second capacitor and the main current path is used.

In an embodiment, the coupling of the drive coil to the first capacitor is effected by means of an electrical parallel connection. In other words, the drive coil is connected in parallel to the first capacitor and electrically contacted to it. In this case, preferably, the switching element or a further switching element is connected in series to the drive coil, so that by actuating the switching element, such as a semiconductor switch, such as, e.g., a transistor or a thyristor, the drive coil is energized by means of the first capacitor. In this way, the electrical energy stored in the first capacitor is dissipated by the drive coil. In particular, in this case, the second capacitor, if it is present, is connected in parallel to the first capacitor, wherein expediently a current flow from the second capacitor to the first capacitor is prevented by a diode.

For example, the circuit breaker comprises a secondary current path that has the reed relay and the electric coil of the switch. If the circuit breaker is a component of the on-board electrical system of the motor vehicle, a high-voltage on-board electrical system of the motor vehicle is expediently safeguarded by means of the main current path. The secondary current path here is preferably a component of a low-voltage on-board electrical system which has, for example, 12 volts, 24 volts, or 42 volts. In particular, the electrical voltage and/or the electric current of the secondary current path is less than the respective corresponding value of the main current path. As a result, the current flow conducted by the switch but not by the electric coil of the switch is interrupted. Consequently, during operation, the electric coil of the switch and the reed relay conduct relatively low electrical voltages/electric currents, wherein relatively large electric currents/electrical voltages conducted by the main current path can be switched by the circuit breaker.

In an embodiment of the invention, the circuit breaker comprises a control unit, which is created, for example, by means of electrical and/or electronic components. For example, the control unit comprises a microprocessor. The reed sensor (reed relay) is coupled in terms of signaling to the control unit, which in turn is connected to the switch in terms of signaling. Consequently, when a fault is detected, a signal is first transmitted by the reed switch (reed relay) to the control unit and is evaluated by the control unit. If the electric current flow detected by the reed relay exceeds a threshold value, a control signal for the switch is created by the control unit, so that the main current path is electrically interrupted. The switch in this case is, for example, a semiconductor switch whose gate is electrically contacted, for example, to the control unit. For example, the semiconductor switch is a power semiconductor switch, such as a GTO or MOSFET. Alternatively, the switch is an electromechanical switch, such as a relay or has a number of switching elements of this type, such as, for example, a semiconductor switch and an electromechanical switch, which are connected in parallel or in series. For example, the switch comprises two series-connected electromechanical switches or a contactor in a double-break configuration. The control unit expediently comprises an energy storage, for example, a battery or a capacitor, so that monitoring is made possible even if the external power supply for the control unit fails at least for a certain period of time.

The switch can have an armature which is at least partially disposed within the electric coil. The armature is mechanically coupled to at least one of the switch contacts of the switch, in particular connected to them, preferably attached thereto. If the energization of the electric coil changes, consequently the armature is moved within the electric coil. For example, the armature and/or the switch contact is spring-loaded. The spring force is canceled by the magnetic force, which is provided by the electric coil, if it is energized. Consequently, in the event of an interruption in the energization of the electric coil, the switch contact is moved on account of the acting spring force, so that the switch is brought into an open state. Safety is increased in this way.

Expediently, an auxiliary drive is coupled to the armature. The auxiliary drive is expediently activated only if the reed relay is switched. Consequently, in the event of a fault/overcurrent, the armature is moved relatively quickly, so that a switching time of the circuit breaker is shortened. Expediently, the drive coil is a component of the auxiliary drive, provided that the drive coil is present. Consequently, the electrical energy stored in the electric coil is dissipated by means of the auxiliary drive. Consequently, the armature is accelerated due to the electrical energy already stored in the circuit breaker. Particularly preferably, in this case the second capacitor is present, so that a force applied by the auxiliary drive is relatively large.

Expediently, the auxiliary drive comprises an eddy current drive. The eddy current drive has a second electric coil, against which an electrical conductor expediently bears mechanically in the electrically conductive state of the circuit breaker, an insulation layer preferably being located between these. The electrical conductor is expediently coupled to the armature or coupled by means of a further element. When the second electric coil is energized, which is in particular the drive coil, the electrical conductor itself is therefore repelled from the second electric coil due to the inhomogeneity of the magnetic field during its generation and the thus induced eddy currents within the electrical conductor. Here, for example, the electrical conductor, hereinafter also referred to as the actuating element, is mechanically coupled directly to the armature, so that the auxiliary drive acts directly on the armature.

In an alternative to this, the auxiliary drive comprises a mechanical spring element, which is connected to the armature by means of a flexible connecting element. The connecting element is, for example, a steel band or made of a rubber, a cord, or the like. Consequently, the auxiliary drive only enables a force exerted in one direction, which is why the armature can be switched without operating the auxiliary drive. Expediently, a mechanical spring element, such as a coil spring or a coiled torsion spring, is connected to the connecting element. The spring element is held in a tensioned state, for example, by means of latching, in particular with the actuating element of the eddy current drive, if it is present. When the auxiliary drive is triggered, the latching is consequently released and the armature is accelerated by the spring element via the connecting element. Expediently, the mechanical spring element is tensioned, if the latching exists. In other words, mechanical energy is stored in the mechanical spring element. Consequently, even when the auxiliary drive is energized with a relatively low energy, a relatively large exertion of force on the armature is made possible, for which purpose the mechanical spring element is pretensioned during assembly.

Expediently, the main current path comprises a busbar, which is produced, for example, by means of a copper bar. The busbar is expediently electrically isolated on the outside, which prevents a short circuit. The busbar is peripherally surrounded at least in sections by a carrier, which in particular bears against the busbar in a positive manner. The carrier is expediently made of a ferromagnetic material and, for example, is plugged onto the busbar. Consequently, the magnetic field surrounding the busbar is formed by the carrier. The carrier has a recess within which the reed relay is positioned. The recess is configured in particular groove-shaped, wherein the opening of the groove is expediently closed by means of the busbar. Alternatively, the recess is designed in the manner of a gap, so that the carrier is not formed completely surrounding the busbar due to the gap, but has two ends spaced apart from one another by means of the gap. As a result, the reed relay is penetrated substantially only by the magnetic field lines, which are caused by the electric current flow conducted by the busbar. Consequently, substantially only the magnetic field, generated by the electric current flow, is detected by the reed relay due to the carrier made of a ferromagnetic material. Further external magnetic fields, in contrast, are detected by the reed relay only to a relatively small extent, which is why the number of false trips is relatively low.

The reed relay can be held within the recess, wherein an air gap is formed between the carrier and the reed relay. It is made possible hereby by the air gap to set the current strength of the electric current flow, which is conducted across the main current path and at which a switching operation of the reed relay is triggered. In other words, by means of the air gap, the strength of the magnetic field penetrating the reed relay is set as a fraction of the magnetic field penetrating the carrier. As a result, an adjustment of the circuit breaker (trip threshold) is made possible by a change in the carrier, in particular by means of adjustment of the air gap. Replacement of the reed relay is not required, however.

Consequently, in the manufacture of the circuit breaker, only a single type of reed relay is needed, regardless of the desired operating condition.

The reed relay can be held within the recess by means of a holder, so that the air gap is substantially constant even with a vibration of the circuit breaker. Here, the reed relay is at least partially surrounded positively and/or frictionally by the holder, which is at least partially disposed within the recess. The holder itself is expediently made of a paramagnetic or diamagnetic material. In particular, the magnetic permeability of the material of the holder is substantially between 0.9 and 1.1 and expediently substantially equal to 1, so that the magnetic field conducted by the carrier is substantially unaffected by the holder.

To protect an on-board electrical system of a vehicle, such as a motor vehicle or an aircraft, a circuit breaker is used which comprises a main current path that includes a switch and a reed relay for detecting an electric current flow across the main current path. The switch is coupled to the reed relay, for example, electrically or in terms of signaling. The on-board electrical system is particularly preferably a high-voltage on-board electrical system, which conducts an electric current with a current strength greater than 10 amperes, 20 amperes, 50 amperes, 100 amperes, or 200 amperes. In particular, the maximum electric current strength carried by the high-voltage on-board electrical system is less than 2000 amperes, 1800 amperes, or 1500 amperes. In particular, the electrical voltage of the high-voltage on-board electrical system is greater than 100 volts, 200 volts, 300 volts, or 350 volts. Expediently, the electrical voltage of the high-voltage on-board electrical system is less than 1000 volts, 800 volts, or 600 volts.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

If individual components are referred to as the first, second, third, . . . component, this serves in particular only to designate the particular component. In particular, this does not imply the presence of a certain number of components.

Figure 1:
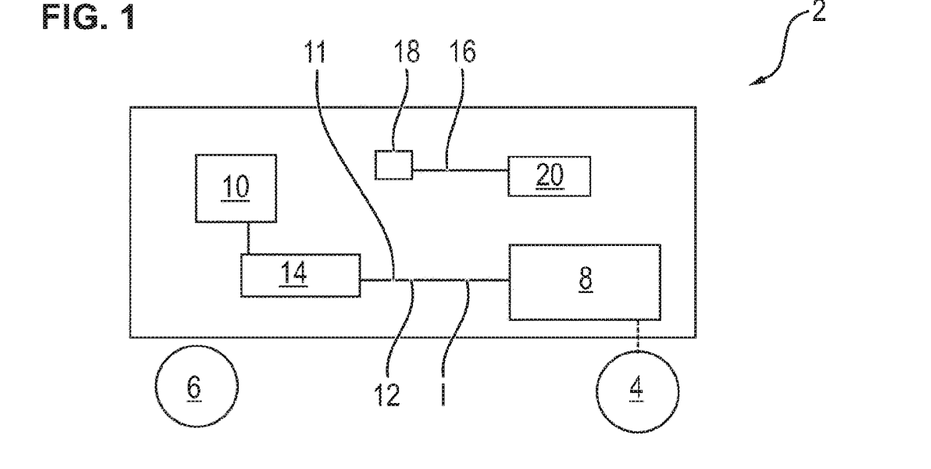
FIG. 1 shows in a schematically simplified form a motor vehicle with a high-voltage on-board electrical system having a circuit breaker.

A motor vehicle 2 with drive wheels 4 and non-driving wheels 6 is shown in a schematically simplified form in FIG. 1. Drive wheels 4 are coupled to an electric motor 8, which has an inverter (not shown in greater detail). The current to inverter/electric motor 8 is supplied by a high-voltage battery 10, by means of which electrical energy is provided, wherein an electrical voltage of 400 volts is applied between the two poles of the high-voltage battery. High-voltage battery 10 is coupled by means of an electric line 11 to inverter/electric motor 8, wherein an electric current flow I of up to 1000 amperes is conducted by electric line 11. High-voltage battery 10, electric line 11, and inverter/electric motor 8 are components of a high-voltage on-board electrical system 12.

To protect high-voltage electrical system 12, it has a circuit breaker 14 which triggers in an overcurrent, therefore, at an electric current flow I that exceeds 1000 amperes and is caused, for example, due to a short circuit within inverter/electric motor 8, and therefore electrically disconnects high-voltage battery 10 from inverter/electric motor 8. Motor vehicle 2, moreover, has a low-voltage on-board electrical system 16 with a low-voltage battery 18, between whose respective electrical poles an electrical voltage of 12 volts or 48 volts is applied. Low-voltage on-board electrical system 16 further comprises a number of actuators 20, by means of which adjustment parts, such as, e.g., windows or seats, can be electrically adjusted.

Figure 2:
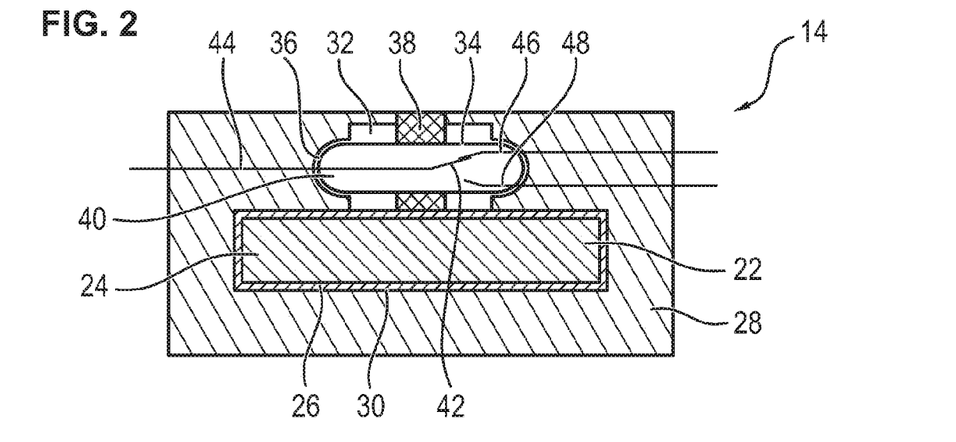
FIG. 2 in a sectional view shows a busbar of the circuit breaker and a reed relay for detecting an electric current flow across the busbar, which is disposed in a recess of a carrier.
Figure 3:
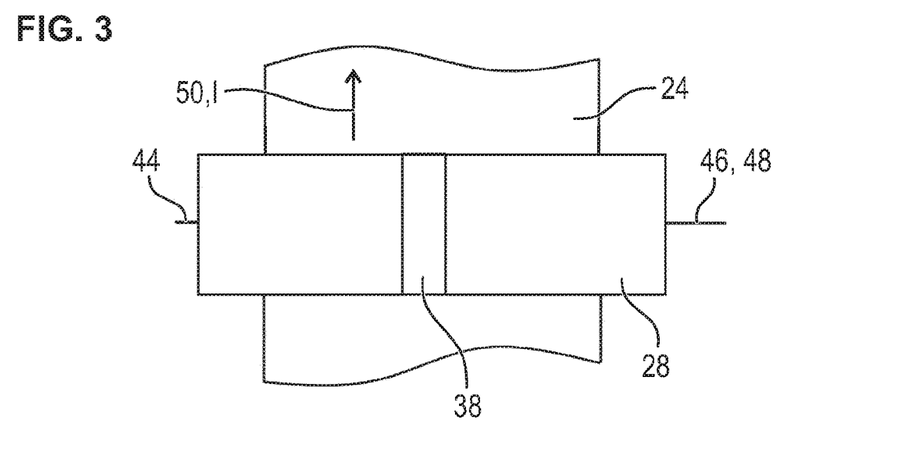
FIG. 3 is a plan view of the carrier plugged onto the busbar.

Circuit breaker 14 has a main current path 22 with a busbar 24, which is shown in a cross section in FIG. 2 and in a plan view in FIG. 3. The substantially cuboid busbar 24 has a copper core, therefore, a core made of a copper, which is surrounded on the outside by an insulating layer 26 made of a plastic, so that an electrical short circuit with other components of circuit breaker 14 can be substantially ruled out. Busbar 24 is surrounded by a carrier 28, which is also configured substantially cuboid. Carrier 28 is made of a ferromagnetic material and has a central opening 30, within which busbar 24 is disposed in a positive manner. Further, carrier 28 comprises a groove-shaped recess 32, running parallel to busbar 24 and the opening of which is closed by means of busbar 24. In other words, recess 32 and opening 30 are connected to one another. Within recess 32, a reed relay 34 is disposed, which, however, is spaced apart from carrier 28 to form an air gap 36. In other words, reed relay 34 does not bear against carrier 28. Reed relay 34 is held within recess 32 by means of a holder 38, so that air gap 36 remains even with vibration of circuit breaker 14. Holder 38 is made of a material having a magnetic permeability $\mu_r=1$, and is supported at the end, for example, on busbar 24.

Reed relay 34 has a switch contact 42 which is arranged within a glass tube 40 and is electrically contacted to a center terminal 44. Switch contact 42 is made of a nickel-iron alloy and is pivotable between a first terminal 46 and a second terminal 48. Glass tube 40 itself is filled with nitrogen. If there is the electric current flow I and consequently there is a current flow in a direction 50 that is perpendicular to the cross section shown in FIG. 2, a magnetic field forms around busbar 24 and is conducted by carrier 28 through reed relay 34. Depending on the strength of the magnetic field, switch contact 42 is deflected, so that center terminal 44 is electrically contacted either to first terminal 46 or second terminal 48. Consequently, reed relay 34 detects whether electric current flow I exceeds a certain value, no electrical energy being needed for the detection, therefore, for the operation of the sensor itself.

Figure 4:
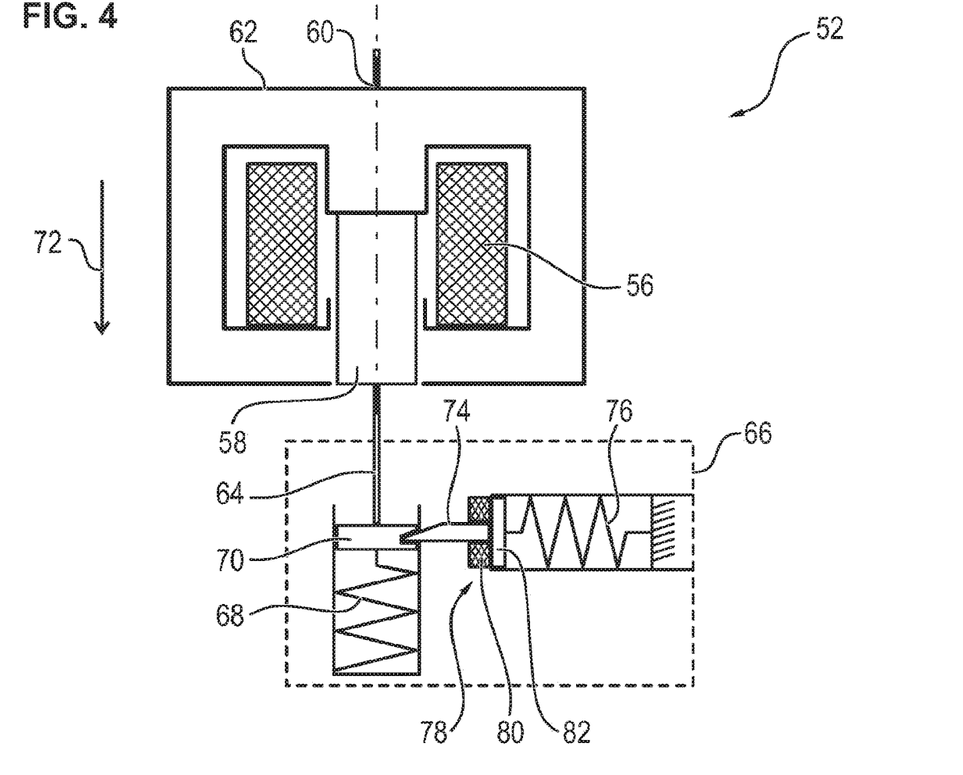
FIG. 4 shows an armature, disposed within an electric coil, of a switch of the circuit breaker, which is coupled to a first embodiment of an auxiliary drive.
Figure 8:
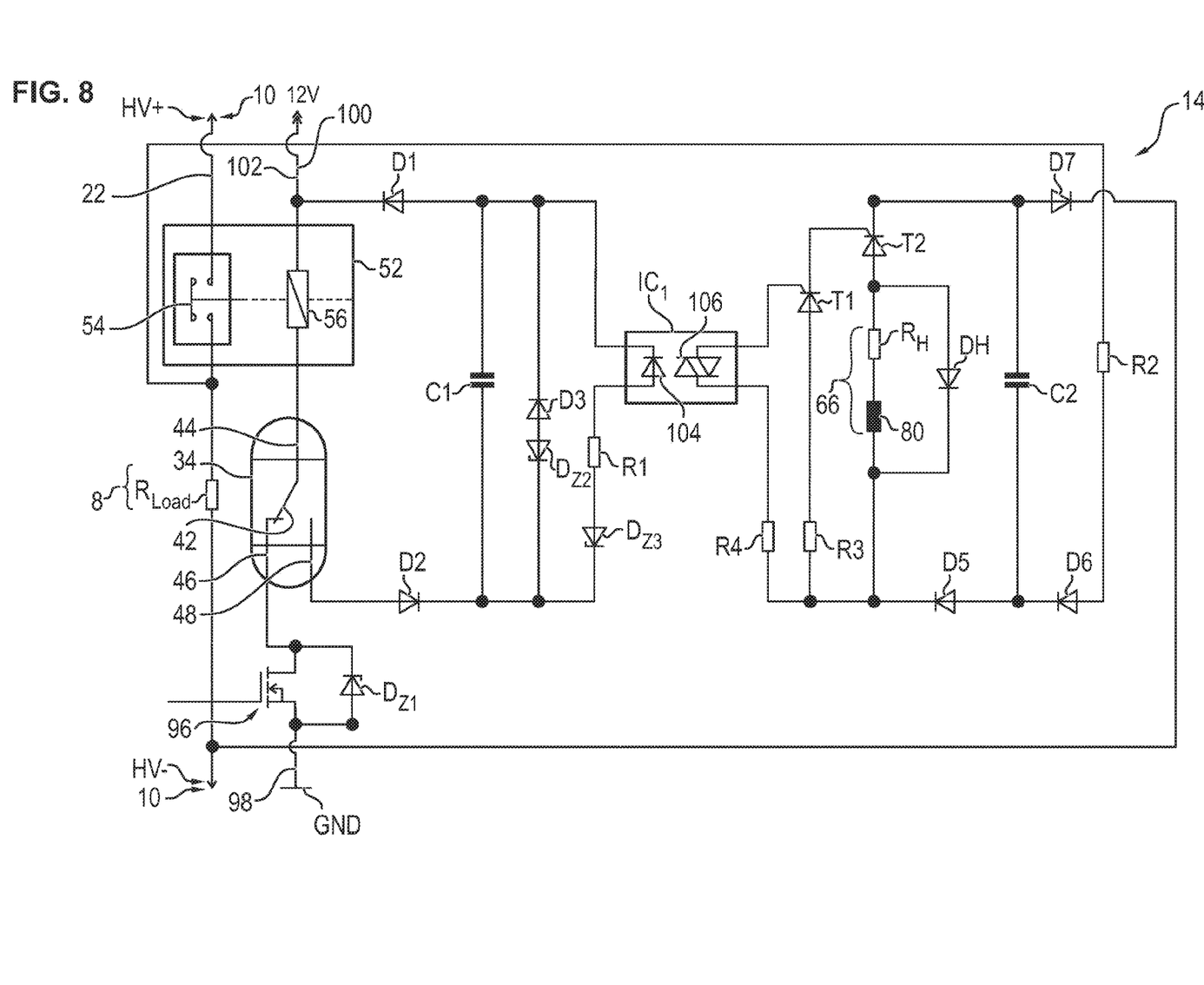
Figure 9:
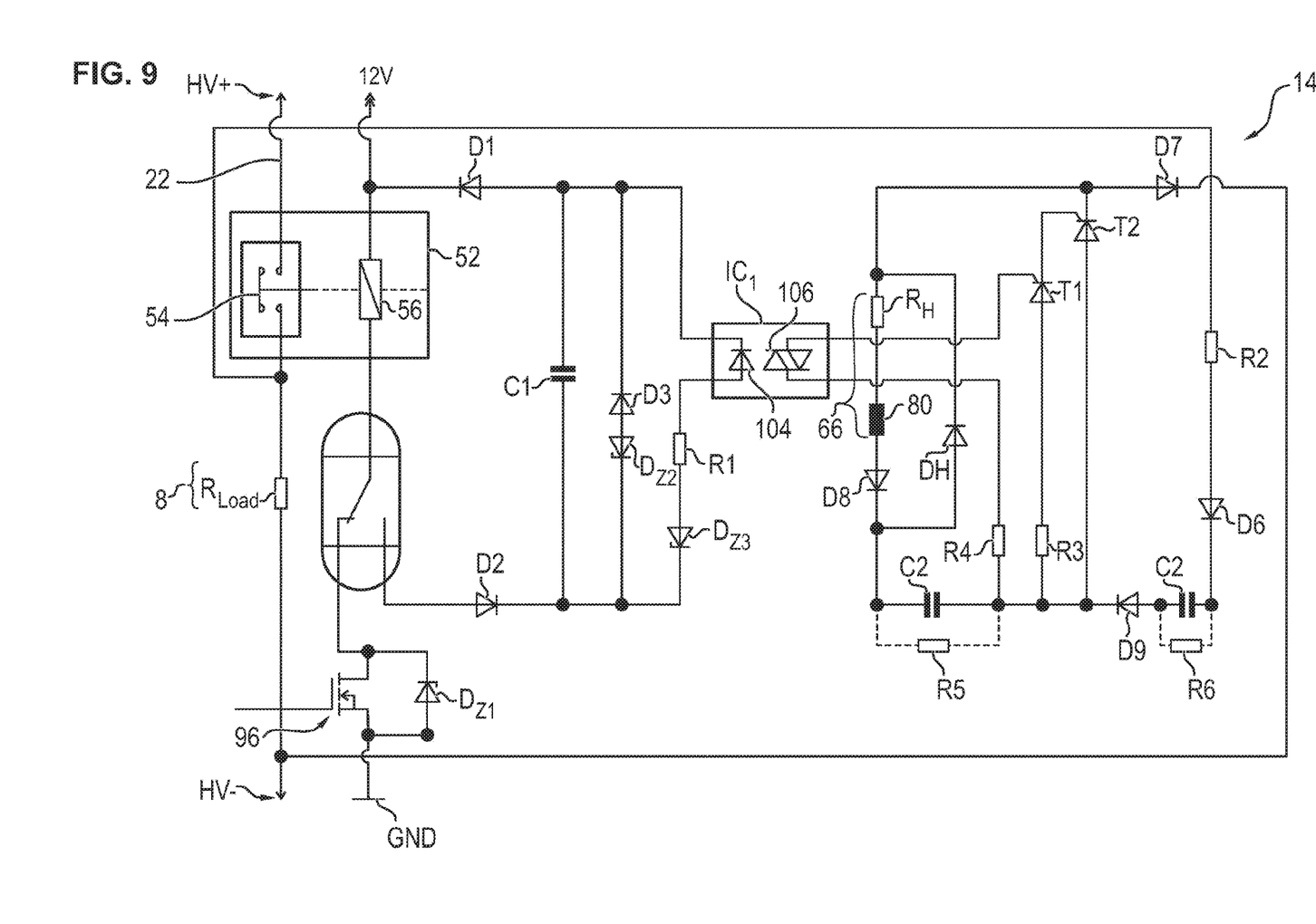

FIG. 4 shows a switch 52 of the circuit breaker 14 in detail, which is designed in the manner of an electromechanical switch and comprises, for example, a contact bridge 54 for double interruption (FIGS. 8 and 9). Switch 52 has an electric coil 56, which is shown in a sectional view along the longitudinal axis. An armature 58 is positioned within coil 56; the armature is made of a ferromagnetic material or a permanent magnet, which protrudes on the end side with the formation of a coupling point 60 of the electric coil and a yoke 62 that surrounds it and is made of a ferromagnetic material, such as iron, and, for example, is made of a solid iron core or designed as laminated, therefore, made as a laminated core with sheets electrically isolated from one another, in particular is made of individual transformer sheets. Contact bridge 54 is connected at coupling point 60.

At the opposite end of armature 58, a flexible connecting element 64 is connected in the form of a steel strip, by means of which an auxiliary drive 66 is connected to armature 58. Auxiliary drive 66 has a mechanical spring element 68 in the form of a spring, to which at the end an end member 70 is connected to which connecting element 64 is attached. A force is exerted by means of mechanical spring element 68 on armature 58 in an opening direction 72 via connecting element 64. When armature 58 is moved in opening direction 72, the electric current flow I across main current path 22 is interrupted and, for example, contact bridge 54 is moved into an open position.

End element 70 is latched to a holding element 74, so that despite the tensioned mechanical spring element 68, end element 70 remains in a predefined position. Due to the flexible connecting element 64, movement of armature 58 in opening direction 72 for interrupting the flow of current is made possible, wherein auxiliary drive 66 is not activated. Upon activation of auxiliary drive 66 and release of holding element 64 from end member 70 and thus elimination of the latching, armature 58 is moved in opening direction 72, however, due to connecting element 64, wherein mechanical spring element 68 is relaxed. Holding element 74 is pressed by means of a second mechanical spring element 76 against end member 70 and the recess formed there, so that the latching exists.

An eddy current drive 78 with a drive coil 80 and an actuating element 82 is positioned between holding element 74 and second mechanical spring element 76, wherein actuating element 82 is connected at the end to second mechanical spring element 76. Actuating element 82 is made of an electrically conductive material, such as, for example, aluminum and has a disc-shaped form with, for example, a circular cross section. Upon energization of drive coil 80, consequently, actuating element 82 is moved against the spring force of second mechanical spring member 76 and thus holding element 74 is removed from end element 70, which disengages their engagement to one another. As a result, due to mechanical spring element 68, end element 70 is moved in opening direction 72 and consequently armature 58 as well coupled thereto by means of connecting element 64.

Figure 5:
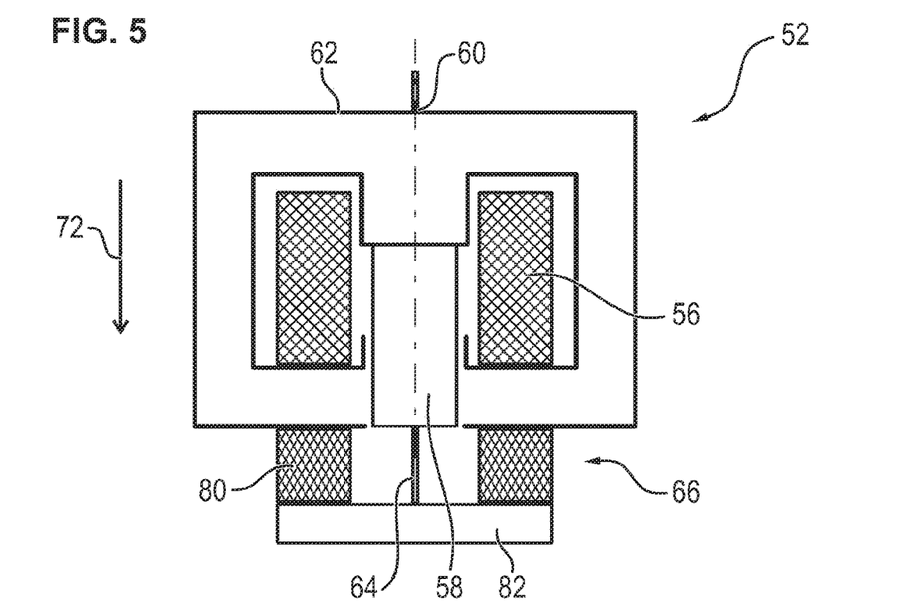
FIG. 5 schematically shows a further embodiment of the auxiliary drive coupled to the armature.

A further embodiment of auxiliary drive 66 is shown in FIG. 5; said drive is coupled to armature 58 of switch 52, which, as in the previous embodiment, is disposed within electric coil 56. Electric coil 56 itself is again surrounded by yoke 62. Armature 58 also has coupling point 60 on its one longitudinal side. Connecting element 64, which may be designed as flexible or rigid as well, is also attached at the remaining end. Connecting element 64 is connected to actuating element 82 of auxiliary drive 66, which is designed in principle similar to the previous exemplary embodiment. Here as well, actuating element 82 is configured disc-shaped with a circular cross section and made of a ferromagnetic material, such as aluminum. In the closed state of the switch, actuating element 82 bears loosely against drive coil 80, which is designed differently from the previous exemplary embodiment for an electric current with an increased electric current strength, for which reason drive coil 80 is wound from a relatively thick wire. In addition, drive coil 80 is attached to yoke 62.

When drive coil 80 is energized, actuating element 82 is removed therefrom, and due to connecting element 64, armature 58 is pulled out of electric coil 56 in opening direction 72. If switch 52 is operated in normal operation, therefore, there is no fault, electric coil 56 is appropriately controlled. In this case, there is no energization of drive coil 80, and armature 58 and actuating element 82, if connecting element 64 is rigid, are moved in opening direction 72 to interrupt the electric current flow I. If there is a fault, thus, for example, an overcurrent, drive coil 80 is also energized, which increases the acceleration of armature 58 in opening direction 72.

Figure 6:
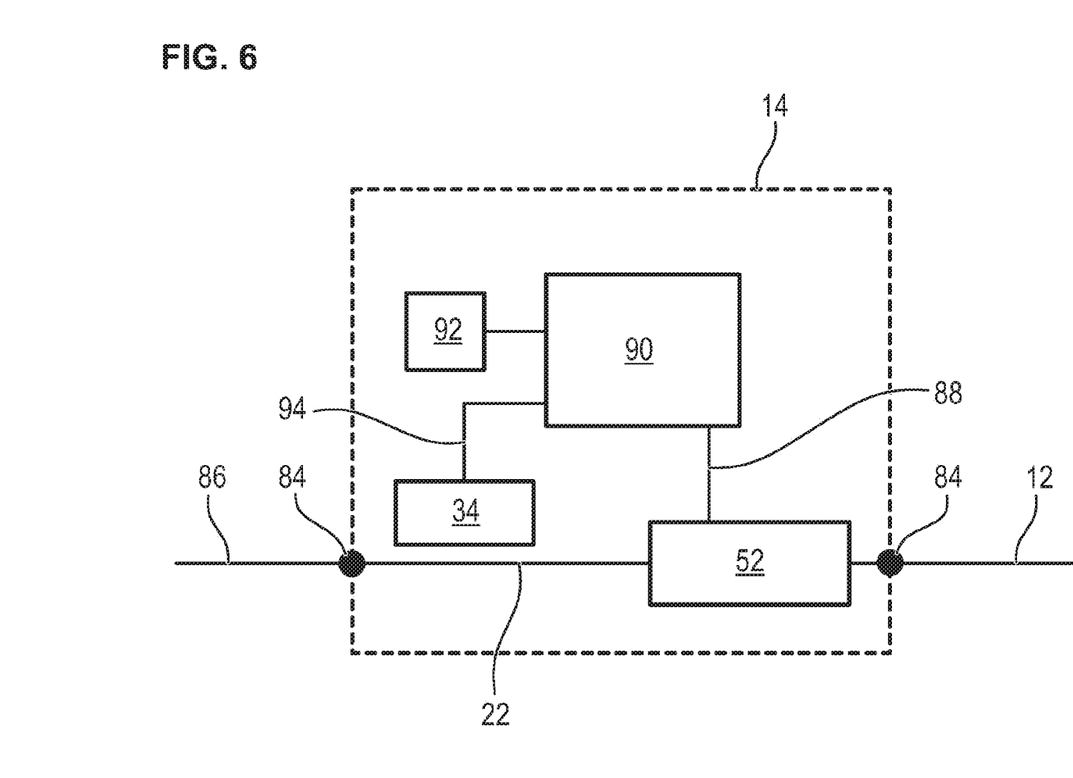
FIG. 6 is a block diagram of a first embodiment of the circuit breaker.

A first embodiment of circuit breaker 14 is shown schematically in a block diagram in FIG. 6. Circuit breaker 14 has main current path 22, which at each end has a contact terminal 84 for electrically contacting a power line 86 of high-voltage on-board electrical system 12. Main current path 22 has switch 52, so that an electric current flow I between the two contact terminals 84 can be adjusted by switch 52. As a result, the two contact terminals 84 are either electrically contacted to one another by means of switch 52 or are electrically isolated from one another. Switch 52 is signal-coupled by means of a first signal line 88 to a control unit 90, which has an energy storage 92 in the form of a battery. During operation, battery 92 is charged by the low-voltage on-board electrical system 16. Due to energy storage 92, operation of control unit 90 and circuit breaker 14 is also possible in the case of a malfunction of low-voltage on-board electrical system 16.

Control unit 90 is further signal-coupled by means of a second signal line 94 to reed relay 34, which is disposed, for example, within carrier 28. The electric current flow I is detected by means of reed relay 34 and this value is passed to control unit 90 by means of second signal line 94. If the detected value exceeds a certain threshold value, switch 52 is triggered by the first signal line 88, so that the electric current flow I between the two contact terminals 84 of circuit breaker 14 is prevented. Switch 52 is, for example, an electromechanical switch or a semiconductor switch, such as a power semiconductor switch, such as, e.g., a MOSFET or GTO. Depending on the configuration of switch 52, an electric current flow or else an electrical voltage is used as the signal for actuating switch 52 by means of first signal line 88.

Figure 7:
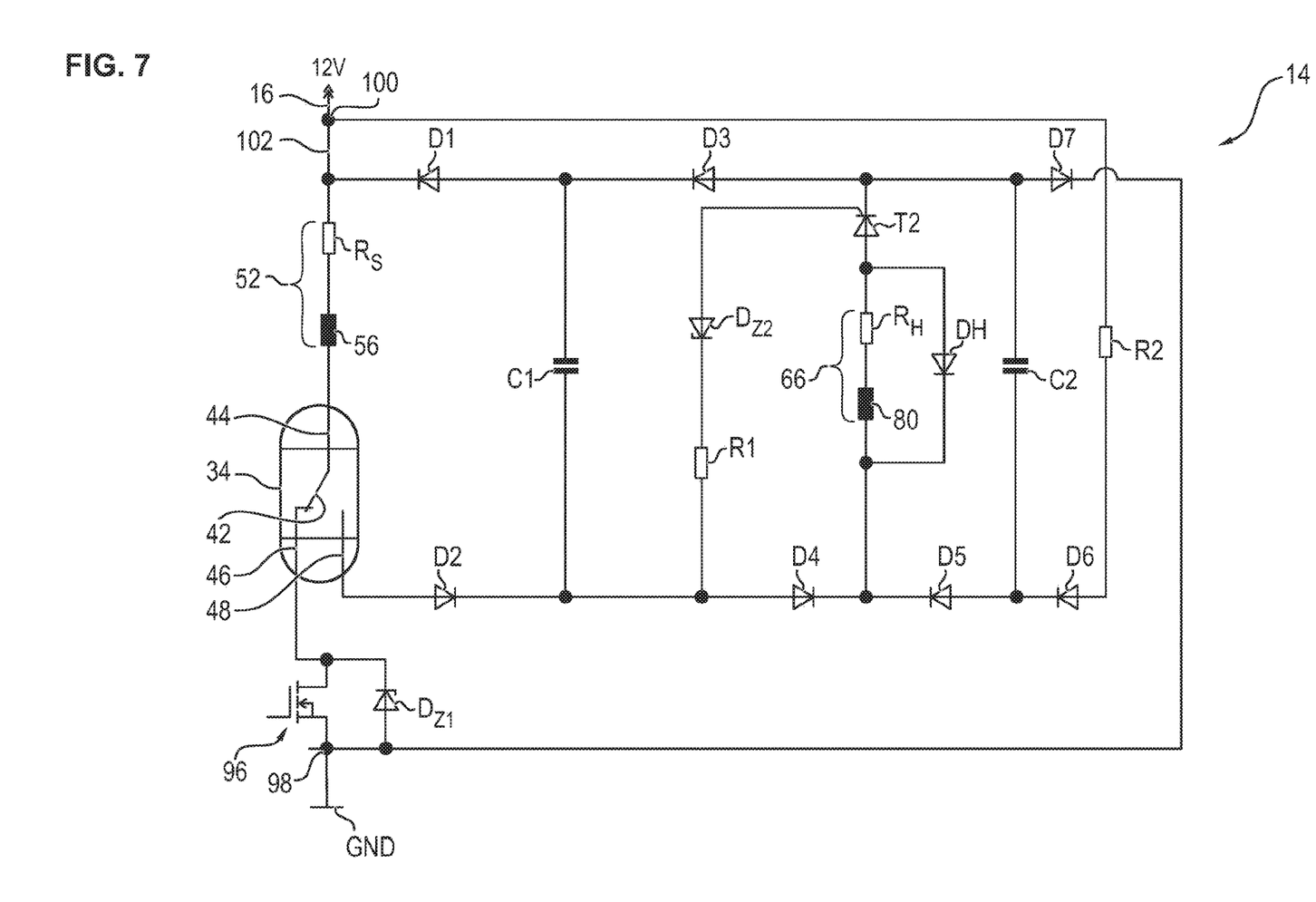
FIGS. 7 to 9 each show as a circuit diagram different versions of the circuit breaker.

A further embodiment of circuit breaker 14, in which switch 52 is again designed as an electromechanical switch and thus has electric coil 56, is shown in FIG. 7. Armature 58, to which contact bridge 54 or other switch contacts are connected, or with which they are at least operatively connected, is disposed in electric coil 56. Switch 52 has a coil resistor $R_s$ which is an ohmic resistor and is formed within switch 52, for example, because of different materials and connected in series to electric coil 56. Electric coil 56 is electrically connected in series to reed relay 34 and electrically contacted directly to center terminal 44 of reed relay 34. First terminal 46 of reed relay 34 is routed to a semiconductor switching element 96 in the form of a field effect transistor, specifically, to its drain, and the source of the field effect transistor is electrically contacted to a second contact terminal 98, by means of which a terminal of circuit breaker 14 is provided to low-voltage on-board electrical system 16. In this case, a first Zener diode $D_{Z1}$ is connected in parallel to the field effect transistor. Second contact terminal 98 is connected to ground GND. Coil resistor $R_s$, in contrast, is routed to a third contact terminal 100 whose potential is 12 volts and is provided by means of low-voltage battery 18. Therefore, a secondary current path 102, which has electric coil 56 and reed relay 34, which are electrically connected in series, is formed between second and third contact terminal 98, 100.

A first diode D1, a first capacitor C1, and a second diode D2, which are in turn connected in series, are connected in parallel to reed relay 34 and electric coil 56 and coil resistor $R_s$. Here, second diode D2 is electrically contacted to second terminal 48 of reed relay 34, wherein the conducting direction is oriented from second terminal 48 in the direction of first capacitor C1. Drive coil 80 of auxiliary drive 66, which due to the different materials used also has an ohmic resistor in the form of a drive coil resistor $R_H$, is connected in parallel to first capacitor C1. Between auxiliary drive 66 and first capacitor C1, on one side, a third diode D3 is electrically contacted to one of the electrodes of first capacitor C1 and a fourth diode D4 to the remaining electrode of first capacitor C1.

Auxiliary drive 66 also has a further diode DH which is connected in parallel to drive coil 80 and drive coil resistor $R_H$ and whose conducting direction is directed opposite to that of fourth diode D4 and third diode D3. A second thyristor T2, the gate of which is electrically contacted to a series connection comprising a second Zener diode $D_{Z2}$ and a first resistor R1, is connected between third diode D3 and drive coil resistor $R_H$. In particular, there is no further Zener diode, so that auxiliary drive 66 has only a single Zener diode, namely, second Zener diode $D_{Z2}$. First resistor R1 is electrically contacted to the electrode of the first capacitor, which is also electrically contacted to second diode D2 and fourth diode D4. A series connection of a fifth diode D5 and a second capacitor C2 is connected in parallel to the series connection of drive coil 80 and drive coil resistor $R_H$ and second thyristor T2, wherein the cathode of fifth diode D5 is routed to the cathode of the fourth diode.

The electrode of second capacitor C2, said electrode which is contacted to fifth diode D5, is further routed to a cathode of a sixth diode D6, whose anode is electrically contacted via a second resistor R2 to third contact terminal 100. The electrode of second capacitor C2, said electrode which is electrically contacted both to second thyristor T2 and third diode D3, is routed via a seventh diode D7 to second contact terminal 98, wherein second capacitor C2 is electrically contacted to the anode of seventh diode D7. Consequently, drive coil 80 is electrically contacted by means of second thyristor T2, on the one hand, also to second capacitor C2. On the other hand, the drive coil is coupled to first capacitor C1.

During operation of circuit breaker 14, semiconductor switching element 96 is triggered, so that secondary current path 102 conducts current. As a result, electric coil 56 is energized and the switch contacts of switch 52 are closed, which is why main current path 22 is also electrically conductive. As a result, operation of electric motor 8 is enabled. Further, second capacitor C2 is charged via sixth diode D6 and seventh diode D7, so that the electrical voltage of low-voltage on-board electrical system 16 is applied to it, in this example, 12 volts. A discharge of second capacitor C2 is prevented by sixth diode D6. If an overcurrent across main current path 22 is detected by reed relay 34, therefore, if the electric current flow I across main current path 22 exceeds a specific threshold value, and consequently the magnetic field surrounding main current path 22 exceeds a certain value, switch contact 42 of the reed relay is at a distance from first terminal 46 and is electrically contacted to second terminal 48. As a result, a current flow between second and third contact terminal 98, 100 via secondary current path 102 is interrupted. The electrical energy still stored in electric coil 56 is transmitted to first capacitor C1 via second diode D2. A return of the energy from first capacitor C1 to coil 56 is prevented due to second diode D2 and first diode D1. As a result, the magnetic field holding armature 58 within electric coil 56 is dissipated relatively quickly. Consequently, if armature 58 is held against a spring force by coil 56, armature 58 is moved relatively early on due to the spring force.

If first capacitor C1 has been charged by electric coil 56, if the voltage applied to it exceeds a threshold, which is adjustable by first resistor R1, second Zener diode $D_{Z2}$, third diode D3, and first capacitor C1, second thyristor T2 is triggered. Consequently, the electrical energy stored in first capacitor C1 is dissipated via drive coil 38, which is consequently energized.

Further, drive coil 80 is energized due to the ignited second thyristor T2 by second capacitor C2, which has a larger stored amount of energy compared with first capacitor C1. A swinging back and consequently polarity reversal of drive coil 80 are prevented by fourth diode D4 and fifth diode D5. Due to the energy stored in first capacitor C1 and in second capacitor C2, a relatively large amount of energy is available to drive coil 80 for operation. Preferably, auxiliary drive 66 is configured according to the embodiment shown in FIG. 4, in which therefore even in the case of a small movement of actuating element 82 due to mechanical spring member 68, a relatively large force that exceeds the force that can be applied by drive coil 80 acts on armature 58. Thus, the switching of the switch contacts of switch 52 is accelerated. As a result, even after a relatively short period of time after detection of the overcurrent by reed relay 34, main current path 22 is interrupted.

FIG. 8 shows a further embodiment of the circuit breaker according to FIG. 7. Secondary current path 102 with electric coil 56, connected in series between second contact terminal 98 and third contact terminal 100, reed relay 34, and semiconductor switching element 96 are left unchanged in comparison with the previous embodiment. The contacting of electric coil 56 to center terminal 44 and the contacting of first terminal 46 to semiconductor switching element 96 correspond to the previous embodiment. Reed relay 34 and coil 56 as well are electrically bridged by first capacitor C1, first diode D1, and second diode D2, wherein the anode of second diode D2 is electrically contacted to second terminal 48, as in the previous embodiment.

In contrast to the preceding embodiment, third diode D3 and second Zener diode $D_{Z2}$, whose anodes are electrically contacted to one another, are connected in parallel to first capacitor C1. The cathode of third diode D3 is routed to the anode of first diode D1 and the cathode of second Zener diode $D_{Z2}$ to the cathode of second diode D2.

Circuit breaker 14 further comprises an optocoupler IC1 whose light-emitting diode 104 is electrically contacted on the cathode side to the anode of first diode D1 and on the anode side to first resistor R1 and a third Zener diode $D_{Z3}$ to the cathode of second diode D2. The cathode of second diode D2 and the cathode of third zener diode $D_{Z3}$ are electrically contacted to one another. Consequently, light-emitting diode 104 of optocoupler IC1 is connected in parallel to first capacitor C1. On the output side, optocoupler IC1 has a DIAC 106, which is electrically contacted on one side to the gate of a first thyristor T1 and via a fourth resistor R4 and a third resistor R3 to the anode of first thyristor T1. The cathode of first thyristor T1 is electrically contacted to the gate of second thyristor T2, whose anode in turn is electrically contacted to auxiliary drive 66 and consequently to drive coil 80. The interconnection of second thyristor T2 to auxiliary drive 66 in this case also corresponds to the previous embodiment. Drive coil 80 is further routed both to the fourth and third resistor R4, R3, therefore, by means of third resistor R3 to first thyristor T1 and by means of fourth resistor R4 to DIAC 106.

Second capacitor C2 and fifth diode D5 are electrically connected in turn in parallel to auxiliary drive 66 and second thyristor T2, wherein fifth diode D5 and second capacitor C2 are connected in series to one another. Also, the two electrodes of second capacitor C2 are electrically contacted, on the one hand, to seventh diode D7 and, on the other, to sixth diode D6 and second resistor R2. However, these are not routed to the secondary flow path 102 but to main current path 22, specifically, on both sides of an effective resistor $R_{LOAD}$ of electric motor 8, which is therefore monitored by circuit breaker 14. As a result, during operation the electrical voltage of the high-voltage battery is present at second capacitor C2, specifically, a positive potential HV+ and a negative potential HV− of high-voltage battery 10. The electrical voltage formed between the two potentials is 400 volts, so that 400 volts are also applied to second capacitor C2.

During operation of circuit breaker 14, semiconductor switching element 96 is actuated such that secondary flow path 102 conducts current. As a result, electric coil 56 of switch 52 is energized, and contact bridge 54 is moved to a closed state, so that the electric current flow I by means of main current path 22 is enabled. In this case, electric motor 8 is energized and consequently motor vehicle 12 is driven. In this case, second capacitor C2 is always charged to the electrical voltage provided by high-voltage battery 10, so that 400 volts are applied thereto. Discharge is prevented by the current-blocking second thyristor T2 and sixth diode D6. For the planned interruption of the energization of electric motor 8, semiconductor switching element 96 is actuated again, for example, so that the flow of current across secondary flow path 102 is interrupted, and consequently contact bridge 54 is moved to an open position and thus the energization of electric motor 8 is interrupted.

If an overcurrent is conducted during operation by main current path 22, reed relay 34 is actuated due to the changed magnetic field and consequently switch contact 42 is swung to second terminal 48, so that energization of electric coil 56 is interrupted. Due to a spring load (not shown), in this case, contact bridge 54, which is coupled to armature 58, is brought into an open state. Electric coil 56 is in turn discharged to first capacitor C1, so that the bringing of contact bridge 54 into the open state is counteracted only by a relatively small magnetic force due to the magnetic field generated by electric coil 56.

An overvoltage at the first capacitor C1 is prevented by second Zener diode $D_{Z2}$, so that it is protected from destruction. The blocking voltage of third Zener diode $D_{Z3}$ is less than the Zener voltage of second Zener diode $D_{Z2}$, so that when first capacitor C1 is charged to a certain extent, light-emitting diode 104 of optocoupler IC1 is activated. As a result, first thyristor T1 ignites, which in turn leads to the ignition of second thyristor T2. As a result, second capacitor C2 is discharged via drive coil 80 of auxiliary drive 66. In summary, drive coil 80 is coupled to first capacitor C1 by means of the two thyristors T1 and T2 and optocoupler IC1. Due to the through connection of thyristor T2, there is a relatively steep current slew rate, so that a relatively large force is exerted by means of auxiliary drive 66. After the finite turn-on time of second thyristor T2 and the discharge of second capacitor C2, the holding current of the two thyristors T1 and T2 is not reached, so that they start to block again, which increases safety. Expediently, the variant shown in FIG. 5 is used as an auxiliary drive and consequently armature 58 is influenced directly by actuating element 82. Due to the relatively large electrical voltage applied to second capacitor C2, the force applied by means of eddy current drive 78 is sufficient for the relatively fast movement of armature 58.

A further modification of circuit breaker 14 is shown in FIG. 9, wherein the configuration of main current path 22 and the contacting of main current path 22 to seventh diode D7, on the one hand, and via second resistor R2 to sixth diode D6, on the other, are left unchanged. Also, secondary current path 102 as well as the parallel connection of first capacitor C1, third diode D3, second Zener diode $D_{Z2}$, and optocoupler IC1, which are connected in series to first resistor R1 and third Zener diode $D_{Z3}$, are left unchanged. Also, auxiliary drive 66 is configured according to the variant illustrated in FIG. 5 and comprises drive coil 80, drive coil resistor $R_H$, and the parallel-connected diode of auxiliary drive DH.

DIAC 106 of optocoupler IC1 is in turn electrically contacted to the gate of first thyristor T1 and via fourth resistor R4 and third resistor R3 to the anode of first thyristor T1. The cathode of first thyristor T1 is routed to the gate of second thyristor T2, whose cathode is electrically contacted to the anode of seventh diode D7. Further, the cathode of second thyristor T2 is electrically contacted both to drive coil resistor $R_H$ and to the cathode of the diode of the auxiliary drive DH, which is connected in parallel to drive coil resistor $R_H$ of drive coil 80 and an eighth diode D8 whose cathode is electrically contacted to the anode of auxiliary resistor DH. Further, an electrode of second capacitor C2 is electrically contacted to the cathode of eighth diode D8 and the capacitor's remaining electrode is electrically contacted to the anode of second thyristor T2 and fourth and third resistor R4, R3. Consequently, drive coil 80 is electrically contacted in turn by means of second thyristor T2 to second capacitor C2, and drive coil 80 is coupled by means of the two thyristors T1, T2 and optocoupler IC1 to first capacitor C1.

The anode of second thyristor T2 is routed via a ninth diode D9 and a third capacitor C3 to the cathode of sixth diode D6, wherein the blocking direction of ninth diode D9 corresponds to the blocking direction of sixth diode D6. Consequently, second capacitor C2 is connected to main current path 22 only by means of third capacitor C3 on one side, so that second capacitor C2 is galvanically isolated from main current path 22. Optionally, second capacitor C2 is bridged by a fifth resistor R5 and/or third capacitor C3 by a sixth resistor R6, each of which have relatively large resistance value.

During operation, semiconductor switching element 96 is actuated in turn, so that coil 56 is energized and consequently switch 52 is brought into a current-conducting state. As a result, the electric current flow I across main current path 22 is enabled. By means of main current path 22, further, second capacitor C2 is charged via third capacitor C3, wherein the full electrical voltage provided by high-voltage battery 10 is not applied at second capacitor C2, but according to the capacitive division ratio appears between second capacitor C2 and third capacitor C3. Because a reduced voltage is applied to second capacitor C2, individual components of circuit breaker 14, such as, e.g., second capacitor C2, sixth diode D6, second resistor R2, . . . , are designed for lower power ratings, so that relatively inexpensive components can be used. Furthermore, second capacitor C2 is galvanically isolated from main current path 22 by third capacitor C3, so that in the case of a short circuit or malfunction of second capacitor C2, a short circuit of the two poles HV+ and HV− of high-voltage battery 10 does not occur, which could otherwise lead to a burn-up or relatively severe damage to high-voltage battery 10.

Upon actuation of reed relay 34, first capacitor C1 is again charged. If this capacitor has a certain state of charge, light-emitting diode 104 of opto-coupler IC1 is activated due to third Zener diode $D_{Z3}$, which is why both first thyristor T1 and second thyristor T2 are triggered. Consequently, second capacitor C2 is discharged via drive coil 80, which is why actuating element 82 of auxiliary drive 66 is moved away from drive coil 80 due to the induced eddy currents, which accelerates an opening movement of contact bridge 54.

The invention is not limited to the exemplary embodiments described above. Rather, other variants of the invention can also be derived herefrom by the skilled artisan, without going beyond the subject of the invention. Particularly, further all individual features described in relation to the individual exemplary embodiments can also be combined with one another in a different manner, without going beyond the subject of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit breaker for interrupting a direct current in an electrical system, comprising:
   a main current path that includes a switch; and
   a reed relay for detecting an electric current flow across the main current path,
   wherein the switch is coupled to the reed relay,
   wherein the switch has an armature which is disposed within an electric coil and is coupled to an auxiliary drive which has an eddy current drive,
   wherein the auxiliary drive is connected to the armature via a flexible connecting element,
   wherein the auxiliary drive has a first mechanical spring element.

2. The circuit breaker according to claim 1, wherein a first end of the flexible connecting element directly contacts one end of the armature and remains in direct contact with the armature during movement of the armature, and a second end of the flexible connecting element directly contacts an end member of the first mechanical spring element and remains in direct contact with the end member during movement of the first mechanical spring element.

3. The circuit breaker according to 2, wherein the eddy current drive includes a second mechanical spring element, a holding element and an actuating element positioned between the holding element and the second mechanical spring element, wherein the end member of the first mechanical spring element is latched to the holding element.

4. A circuit breaker for interrupting a direct current in an electrical system, comprising:
   a main current path that includes a switch; and
   a reed relay for detecting an electric current flow across the main current path,
   wherein the switch is coupled to the reed relay,
   wherein the main current path has a busbar which is peripherally surrounded in a positive manner by a carrier having a recess within which the reed relay is positioned,
   wherein the carrier is made of a ferromagnetic material, and
   wherein the recess forms a gap such that the carrier has two ends spaced apart from one another due to the gap.

5. The circuit breaker according to claim 4, wherein the reed relay is held within the recess via a holder such that an air gap is provided between the carrier and the reed relay, and
   wherein the holder is made of a diamagnetic or paramagnetic material that is different from materials forming the carrier and the busbar, such that a magnetic field conducted by the carrier is unaffected by the holder.

* * * * *